United States Patent [19]

Ishikawa et al.

[11] E Patent Number: Re. 33,277

[45] Reissued Date of Patent: Jul. 24, 1990

[54] AUTOMATIC FOCUSING DEVICE FOR USE IN A CAMERA

[75] Inventors: Norio Ishikawa, Osaka; Takanobu Omaki, Sennan, both of Japan

[73] Assignee: Minolta Camera Kabushiki Kaisha, Osaka, Japan

[21] Appl. No.: 190,834

[22] Filed: May 6, 1988

Related U.S. Patent Documents

Reissue of:

[64] Patent No.: 4,445,761
Issued: May 1, 1984
Appl. No.: 431,288
Filed: Oct. 1, 1982

U.S. Applications:

[63] Continuation of Ser. No. 858,211, Apr. 30, 1986, abandoned.

[30] Foreign Application Priority Data

Oct. 2, 1981 [JP] Japan ..... 56-157921

[51] Int. Cl.[5] ..... G03B 3/10

[52] U.S. Cl. ..... 354/402

[58] Field of Search ..... 354/402

[56] References Cited

U.S. PATENT DOCUMENTS 4,185,191 1/1980 Stauffer ..... 354/25

*Primary Examiner*—Michael L. Gellner
*Attorney, Agent, or Firm*—Price, Gess & Ubell

[57] ABSTRACT

The automatic focusing system disclosed is characterized that the focusing condition of an objective lens to be focused is repeatedly detected with the objective lens being moved, and that defocus signals, each representing a defocus direction and a defocus amount of the lens according to the focusing condition upon each detection, are processed in a predetermined statistic method to produce a final signal. The final signal is effected for controlling the axial position of the objective lens to lead the lens to its infocus position. Therefore, the automatic focusing system according to the present invention achieves the high accuracy of focusing and quickness thereof.

20 Claims, 6 Drawing Sheets

AUTOMATIC FOCUSING DEVICE FOR USE IN A CAMERA

Matter enclosed in heavy brackets [ ] appears in the original patent but forms no part of this reissue specification; matter printed in italics indicates the additions made by reissue.

*This is a continuation of application Ser. No. 858,211, filed on Apr. 30, 1986, now abandoned.*

BACKGROUND OF THE INVENTION

1. Field of the Invention

This invention relates to an automatic focusing device for use in a camera which detects the focus condition of an objective lens by measuring the light from a target object passing through the objective lens, and which automatically adjusts the objective lens to its in-focus position in accordance with the detection.

2. Description of the Prior Art

Heretofore, there was proposed, for example in U.S. Pat. No. 4,185,191, a focus detecting device which detects the focusing condition, i.e. the amount and the direction of deviation of an objective lens from its in-focus position, by measuring the light coming from an object to be photographed and passing through the objective lens. Further, Japanese laid-open patent applications with laid-open numbers Tokkai-Sho No. 56-78811 and Tokkai-Sho No. 56-78823 proposed solutions to the inherent inconveniences in camera automatic focusing devices employing the above-mentioned focus detecting device. The focus detecting device disclosed in U.S. Pat. No. 4,185,191 produces an unfavourable phenomenon that, when a target moves in a plane perpendicular to an optical axis of the objective lens, the focus detecting device indicates different detections for the target object at the same distance before and after the movement. To cope with this problem, the device shown in Tokkai-Sho No. 56-78811 is arranged such that the focus detection for a single target object is made a plurality of times to obtain a plurality of detected signals with the objective lens being stopped. The focusing of the objective lens is adjusted in accordance with an intermediate value obtained by averaging the plural detected signal values, and thus compensating for any scatter in the values of the detected signals. This proposed device may be evaluated as advantageous from the viewpoint of accuracy of the detection, but is disadvantageous from the viewpoint of quickness of detection because it requires detecting operations of a plural of times during which the objective lens must be stationary.

On the other hand, the above-mentioned Tokkai-Sho No. 56-78823 proposes an automatic focusing device which detects the focusing condition and moves the objective lens towards its in-focus position. In the case where a CCD (Charge Coupled Device) is employed as the light detecting device for detecting focusing condition of the objective lens, as in the focus detection device disclosed in U.S. Pat. No. 4,185,191, it requires a certain integration time, as is shown in the art, to obtain the information of light intensity incident on all of each light-receiving or detecting element of the CCD, and further requires a given time period to read the output of each light-receiving element and to process the read-out outputs to discriminate the focusing condition. Accordingly, if the above-mentioned device employing a CCD is used to automatically adjust the objective lens being moved, the position of the objective lens at the time when the CCD detects the light intensity differs from that at the time when a signal representing the focusing condition is generated. Hence, the device shown in Tokkai-Sho No. 56-78823 is arranged such that the focus adjustment is made in accordance with a defocus signal which has been compensated for the amount of movement of the objective lens between the above two positions. Accordingly, the focus adjustment may be made quickly, but the problem overcome by the device proposed in the aforementioned Tokkai-Sho No. 56-78811 still remains. That is, as the signal representing the amount of defocus scatters at and around the true value, the single signal of the amount of defocus cannot guarantee the accuracy of the detection although compensation is made for the amount of movement of the objective lens.

SUMMARY OF THE INVENTION

An object of the present invention is to provide an automatic focusing device which is free from both of the problems separately solved by the devices shown in Tokkai-Sho No. 56-78811 and Tokkai-Sho No. 56-78823.

Another object of the present invention is to provide an automatic focusing device which can adjust an objective lens to its in-focus position quickly and with high accuracy.

With the device disclosed in Tokkai-Sho No. 56-78811, the scatter of the values of the output signals from the focus detecting device at and around a true value is compensated for but at the expense of quickness in the focus adjusting operation. With the device disclosed in Tokkai-Sho No. 56-78823, the focus adjustment is effected quickly, but without consideration about the scattering of detected values, which is the problem solved by the device shown in Tokkai-Sho No. 56-78811. In view of those problems, the present invention is intended to provide an automatic focus adjusting device wherein a defocus signal representing the amount of defocus of an objective lens is calculated from output signals of the light detecting device, with the objective lens being moved towards its in-focus position, a compensation is made to the defocus signal with respect to the amount of movement of the objective lens during the interval from the time of light detection to the time of obtainment of the calculated value, and a statistical process is applied to a plurality of defocus signals including the newly-obtained signal and previous ones to compensate for the "scattering" and to estimate the true value in accordance with which the focus of the objective lens is adjusted, thereby attaining a quick and highly-accurate focus adjustment.

In more detail, the present invention is characterized in that, in an automatic focus adjusting device for automatically adjusting an objective lens to its in-focus position in accordance with output signals from a focus detecting device which detects the focusing condition or the amount of defocus of the objective lens by measuring the light coming from a target object and passing through the objective lens, the amount of defocus is detected with the objective lens being moved, a plurality of the values of the amount of defocus obtained in a plurality of defocus amount-detecting cycles effected during the movement of the objective lens are converted to values equivalent to those that would be obtained at the position where the last value of the amount of defocus is obtained, the plurality of converted values are processed statistically to obtain a mean value of them, and the focusing is adjusted in accordance with the mean value until the next value is detected and produced. For the purpose of data conversion, a device is provided for measuring the amount of movement of the objective lens in each detection cycle and compensation is made, for each measured amount of the movement, to each of a plurality of values of the amount of defocus obtained at different positions of the objective lens such that the plurality of the values of the amount of defocus are converted to the values equivalent to those that would be obtained at a last position of the objective lens.

DETAILED DESCRIPTION OF THE PREFERRED EMBODIMENTS

Figure 1:
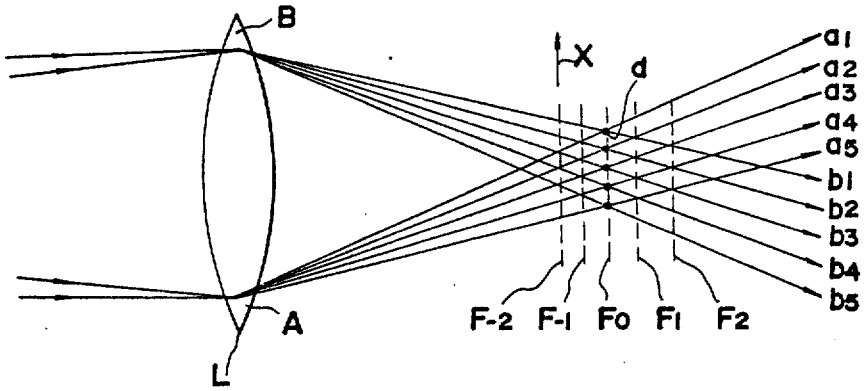
FIGS. 1 and 2 are schematic illustrations for explaining the principle of a known focus-detecting device.
Figure 2:
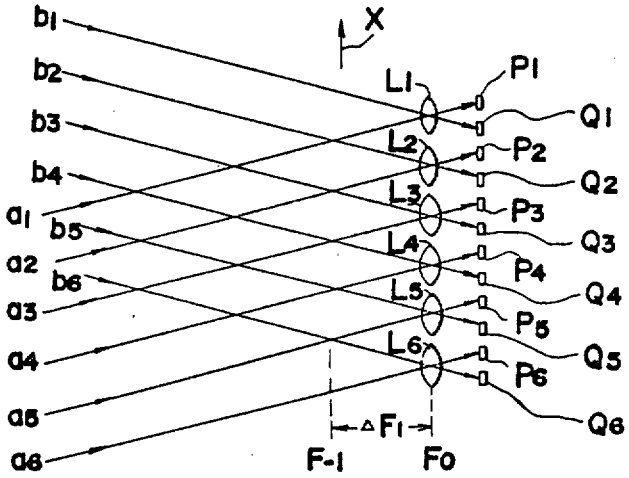

FIGS. 1 and 2 are to explain the principle of focus detection in a known focus-detecting device that is employed in the present invention. Of the light rays coming from a target object of which the distance is to be measured, and passing through an objective lens, several selected rays passing through the peripheral portions A and B of the objective lens are shown in FIG. 1. Rays $a_1$ and $b_1$ come from the same point on the target object. Rays $a_2$ and $b_2$, rays $a_3$ and $b_3$ and so on have the same relationship as that of rays $a_1$ and $b_1$. In short, the rays denoted by characters having the same subscript come from the same point on the target object. Rays $a_1$ and $b_1$ intersect each other at plane $F_0$, which is the image plane. At plane $F_{-1}$, ray $a_1$ and $b_2$, $a_2$ and $b_3$, $a_3$ and $b_4$, and $a_4$ and $b_5$ respectively intersect to each other. At plane $F_{-2}$, rays $a_1$ and $b_3$, $a_2$ and $b_4$, and $a_3$ and $b_5$ respectively intersect to each other. As plane $F_1$, behind plane $F_0$, rays $a_2$ and $b_1$ . . . $a_5$ and $b_4$ intersect to each other. At image plane $F_0$, the images formed by the rays from peripheral portion A and the rays from peripheral portion B of the objective lens L are superimposed and the phase of the images coincides. In contrast thereto, at plane $F_{-1}$, the image formed by rays $b_1$ through $b_5$ shifts relative to the image formed by rays $a_1$ through $a_5$, by an amount approximately equal to the pitch d between the points of intersection of the rays in image plane $F_0$ in a direction perpendicular to an optical axis of the objective lens L. At plane $F_1$, the image formed by rays $b_1$ through $b_5$ shifts relative to the image formed by rays $a_1$ through $a_5$, by an amount approximately equal to the pitch d in the opposite direction from that in the case of the images at plane $F_{-1}$. As the plane becomes more distant from image plane $F_0$ along the optical axis, the images formed by rays $a_1$ through $a_5$ and $b_1$ through $b_5$ on the plane shift from each other by a larger amount. Although pitch d is exaggerated in FIG. 1, rays $a_1$ through $a_5$ may be regarded as parallel with one another if the rays are assumed to pass through lens L in the vicinity of the optical axis of the lens, i.e. paraxial rays, with the pitch d being small. The same can be said with respect to rays $b_1$ through $b_5$. If two images formed respectively by rays ai and bi (i=1, 2, 3 . . . ) are detected at a plane normal to the optical axis and the amount of the shift between two images is calculated, the focus condition at that plane can be detected.

FIG. 2 shows the basic construction of a detector for the intensities of rays ai and bi. Very small lenslets $L_1$ through $L_6$ are disposed in a row with a given spacing to form images of the exit pupil of objective lens L at their image plane where a pair of light detectors Pi and Qi (i=1, 2, 3 . . . ) are placed. The pitch P between each adjacent pair of lenslets $L_1$ through $L_6$ measured in the direction normal to the optical axis is, for example 200μ and the actual number of the lenslets is larger than that shown in the Figure, for example 20. Light detectors Pi and Qi have their light receiving area and position determined to receive the light from peripheral portions A and B of objective lens L. It should be understood that light detectors Pi and Qi comprises a charge coupled device (CCD). With that arrangement of the light detectors, each pair of light detectors Pi and Qi receives the light from the same point on a target object when the row of lenslets $L_1$ through $L_6$ is on image plane $F_0$. In other words, two groups of light detectors Pi and Qi respectively receive images which are not shifted in phase from each other. When the row of the lenslets is on the plane $F_{-1}$ in front of the image plane $F_0$, the phase of the image received by the group of light detectors Qi shifts by the amount equal to the pitch P of the lenslets, in the direction of arrow X relative to the image received by the group of light detectors Pi. In like manner, when the row of lenslets is on plane $F_{-2}$, $F_{-3}$ or so on, the image received by the group of light detectors $Q_1$ shifts by an amount equal to twice or thrice or so on as much as the pitch P, i.e. 2P or 3P or so on, in the same direction relative to the image received by the group of light detectors Pi. When the row of lenslets is on plane $F_1$, $F_2$ or so on, behind the image plane $F_0$, the image received by the group of light detectors Qi shifts in the opposite direction by an amount equal to P, 2P or so on. Accordingly, the amount and direction of the relative shift of the two images can be obtained in terms of the multiple of pitch P by detecting the correlation of the two "video" signals derived from the two groups of light detectors Pi and Qi. The amount of defocus represented by single pitch P corresponds to the distance between a predetermined image plane $F_0$ and a plane on which the objective lens is focused now. These amounts of image shift and the amount of defocus of the objective lens are in a relationship determined by the geometric arrangement, such as the pitch in the row of lenslets and the spaces between each adjacent pair of light detectors Pi and Qi. Hence, if the amount of the image shift is obtained, the amount of defocus can be obtained accordingly.

In an actual focus-detecting operation, the detected values obtained for a target object at the same distance may vary and scatter with detection. This is due to error in the manufacture of detecting device components, such as for example unequal shapes of lenslets $L_1$, $L_2$, . . . , irregularity in the pitches there-between, unequal sensitivities of light detectors and so on. Such errors will be referred to hereafter as static error, and errors generated due to the motion of the objective lens during the detecting operation.

Figure 3:
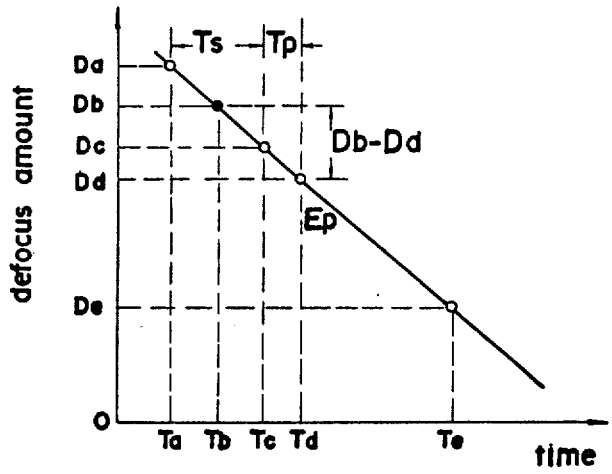
FIGS. 3 and 4 are graphs showing the amount of defocus at each point of time during the movement of the objective lens towards its in-focus position.

Now, explanation will be made about an automatic focusing system according to this invention wherein a focusing condition detecting device is employed to detect the amount of defocus in accordance with the operational principle described above. To facilitate understanding of the present invention, a known method of eliminating the above mentioned dynamic error will be described first. As described before, from the start of the detecting operation until the production of the detected value the detecting device requires time Ts for the CCD to measure light and integrate the measurement, and time Tp to process the output signal of the CCD. Accordingly, when the detecting operation is effected with the objective lens being moved, the value of defocus (designated by Ep hereafter) as the result of the detection does not correspond to the position of the objective lens at the time when the output representing the value is produced. This matter is described in more detail hereafter with reference to FIG. 3. The graph in FIG. 3 shows the defocus amount of the objective lens at each point of time during the movement of the objective lens towards its in-focus position. Assume that the detecting device starts light measurement and integration of the CCD at time Ta and terminates the same at time Tc and then processes the output of the CCD to thereby produce the resultant output Ep at time Td. As the resultant output Ep of the detection was based on the information of a light measurement obtained when the objective lens moves from a defocus or out-of-focus position Da to another defocus position Dc, the resultant value Ep of the detection may be considered to have been obtained when the objective lens was at the intermediate position Db, wherein Db=(Da+Dc)/2. If such a presumption is adopted, it is seen from the graph that there occurs a difference of the amount (Db−Dd) between the intermediate position Db and the position Dd where the objective lens resides when the resultant output Ep is produced. Accordingly, if the resultant output Ep is used for the control of the objective lens position without any modification thereto, accuracy can not be expected to result. Therefore, if the amount corresponding to the difference (Db−Dd) is subtracted from Ep, the balance will be the value $Ep_1$ that would be obtained at the position of the objective lens at the time Td when the resultant output Ep is produced, whereby the above mentioned inconvenience is eliminated.

The amount of the actual movement of the objective lens may be detected, for example, counting for a given time the pulses from an encoder which is driven in linked relationship with the objective lens and which generates a number of pulses commensurate with the amount of lens movement. When the amount of movement from time Ta to Tc is M and the amount of movement from time Tc to Td is L, the above-mentioned detected value $Ep_1$, which has been compensated for, is obtained from the following formula $$Ep_1 = Ep - \left(\frac{M}{2} + L\right) \tag{1}$$

Figure 4:
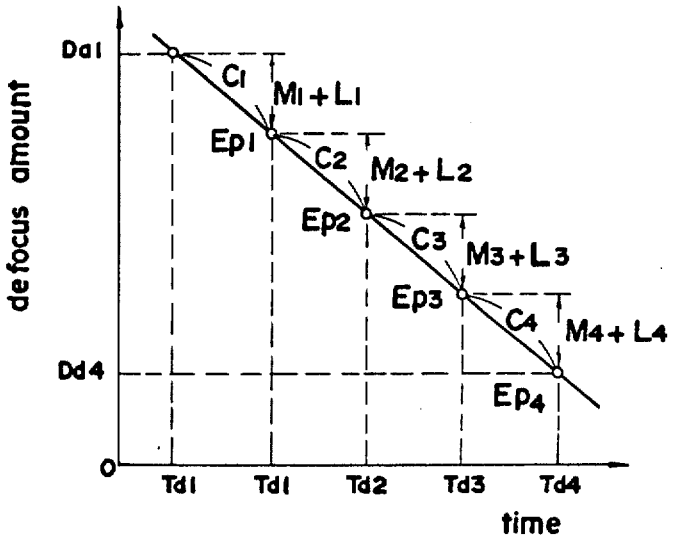

The above description is the method as proposed in Tokkai-Sho No. 56-78823 and wherein the detected amount of defocus is compensated for the expected change of the amount during the movement of the objective lens. In FIG. 3, if the amount of actual movement of the objective lens from its defocus position Dd to the defocus position De when the objective lens is in the latter position De, the detected value that would be obtained at the defocus position De of the objective lens, can be calculated by subtracting the amount of the movement from the detected value $Ep_1$ which has been calculated in accordance with formula (1). Then description is made with reference to FIG. 4, about the method according to the present invention wherein "detected values" for an instantaneous position of the objective lens are calculated from the values actually detected respectively in a plurality of previous detection cycles by applying the known method of compensation as described above, the mean value of the calculated values is obtained, and the position of the objective lens is controlled in accordance with the mean value. FIG. 4 shows a process wherein operation of detecting the defocus amount is effected repeatedly with the objective lens being moved towards its in-focus position. In detecting cycle $C_1$, the objective lens moves along its optical axis by an amount $M_1$ during light measurement and integration of a CCD and by another amount $L_1$ during the processing of the output from the CCD, and a signal representing a "detected value" $Ep_1$, that has been compensated for the expected shift or change during the movement of the objective lens in the detection cycle is produced. In the same manner, compensated, "detected" values $Ep_1$, $Ep_2$ and $Ep_3$ are produced in connection with detection cycles $C_2$, $C_3$ and $C_4$. Now assume that the objective lens is at the position providing the amount of defocus Dd4. This position is distant from the position at time Td1 when detection cycle C is completed, by the amount commensurate with the amount of the movement of the objective lens during the three detection cycles $C_2$, $C_3$ and $C_4$. Accordingly, if the amounts of the movement of the objective lens during those three detection cycles $C_2$, $C_3$ and $C_4$ is subtracted from the value $Ep_1$ detected in detection cycle $C_1$, the detected value $Ep_1$ is converted to a defocus signal for the instantaneous position of the objective lens where the latter provides the defocus amount of Dd4. If the defocus signal converted in that manner is designated by $Ep_{1-4}$, the following formula will be given:

$$Ep_{1-4} = Ep_1 - \{(M_2+M_3+M_4)+(L_2+L_3+L_4)\} \tag{2}$$

$Ep_1$ may be given by the following formula similar to formula (1):

$$Ep_1 = E_{01} - \left(\frac{M_1}{2} + L_1\right) \tag{3}$$

In formula (3), $E_{01}$ designates the value detected in the detection cycle $C_1$ and to which the compensation has not been given, while $M_1$ through $M_4$, and $L_1$ through $L_4$ are the values detected by the means for detecting the amount of movement of the objective lens. A similar conversion process is given to values $Ep_2$ and $Ep_3$ detected in the cycles $C_2$ and $C_3$ respectively and the values can be presented by the following formula:

$$Ep_{2-4}=Ep_2-\{(M_3+M_4)+(L_3+L_4)\} \quad (4)$$

$$Ep_{3-4}=Ep_3-(M_4+L_4) \quad (5).$$

Thus, four defocus signals $Ep_{1-4}$, $Ep_{2-4}$, $Ep_{3-4}$ and $Ep_4$ for the position of the objective lens providing Td4 have been obtained from the values detected in detection cycles $C_1$, $C_2$, $C_3$ and $C_4$. Such a signal conversion process can be effected for a desired number of the detected values obtained in previous detection cycles in so far as the object distance is unchanged. It is to be understood that detected value, Eoi or Epi (i=1, 2, 3 . . . ) obtained in each detection cycle contains or involves the static error which is still involved in the value converted in accordance with the formulas (2), (4) or (5).

Thus, in this invention, the detected values obtained in a plurality of past detection cycles are converted to defocus value for an instantaneous position of the objective lens, the converted defocus signals are statistically processed, e.g. averaged, and the resultant value is used as a final or determined defocus signal for the control of the objective lens whereby the effect of the static error involved in each detected value may be diminished.

When four detected values including the last detected value $Ep_4$ are used, the mean values $\overline{E_4}$ to be obtained in the case of FIG. 4 will be represented as follows:

$$\overline{E_4}=\tfrac{1}{4}(Ep_{1-4}+Ep_{2-4}+Ep_{3-4}+Ep_{4-4}) \quad (6)$$

wherein $Ep_{4-4}$ corresponds to $Ep_4$. Generally, the mean values $\overline{En}$ when n numbers of detected values are used, is represented as follows:

$$\overline{En}=\frac{1}{n}(Ep_{1-n}+Ep_{2-n}+\ldots+Ep_{n-n})=\frac{1}{n}\sum_{i=1}^{n}Epi_{-n} \quad (7)$$

wherein $Ep_{n-n}$ corresponds to the last detected value Epi and $Ep_{1-n}$ is the detected value detected in the n-th cycle from the last one and that has been compensated for the dynamic error.

Explanation will now be given about the manner whereby the objective lens is controlled during the period from the time when a signal representing a detected value is generated, to the time when the detected value in the next cycle is given. Assume that a switch for initiating the focusing operation is actuated and the first detection cycle is started. If is also assumed that the first detection cycle is effected without driving the objective lens. Accordingly, the value detected in that cycle does not involve the dynamic error due to the movement of the objective lens. When a detected value is obtained, it is compared with a predetermined in-focus range value Ez. If the detected value is smaller than the in-focus range value Ez, a stop command is given to the objective lens driving circuit to leave the objective lens in the stopped condition. In contrast thereto, when the detected value is larger than the in-focus range value, a command signal is generated to drive the objective lens towards an in-focus position. In the latter case, the motor is actuated to start the movement of the objective lens. It should be understood that the objective lens is not moved continuously until the next new signal of a detected value is generated, but rather that the objective lens is controlled in the following manner. With the movement of the objective lens, an encoder is driven to generate a train of pulses therefrom. It is assumed here that the encoder is arranged to generate one pulse in response to the movement of the objective lens by an amount corresponding to a single unit of the defocus value given by the output signal from the focus detecting device. The amount of defocus obtained in the first detection cycle is represented by "$Ep_1$". If "1" is subtracted from the defocus value $Ep_1$ when the encoder generates a single pulse after the objective lens starts to move, the rest will be the defocus value converted to be the value as if it were detected at the new position of the objective lens at the time when the single pulse is generated. Then, the defocus value $Ep_1-1$ is compared with the in-focus range value Ez to determine whether to continue or stop the driving of the motor. If $Ep_1-1>Ez$, the motor is further driven and "1" is subtracted from the defocus value "$Ep_1-1$" in response to the second pulse. The rest $Ep_1-2$ is compared with the in-focus range value Ez and the motor is controlled in accordance with the result of the comparison. In this way, the similar operation will be repeated while the defocus value obtained by the subtraction in response to the pulse from the encoder is larger than the in-focus range value, until a second detected value is generated from the CCD. At the same time as such objective lens control operation, the detecting device effects the second integrating operation in the CCD and processing of the output of the CCD. When a signal representing the detected value in the second detection cycle is generated, the error due to the movement of the objective lens is removed from the detected value because the latter value is obtained while the objective lens is being moved. The number of pulses generated from the encoder during the period of the integration in the CCD and the number of pulses generated during the period of the processing of the outputs of the CCD in the detecting device, are counted respectively and are stored in two predetermined memories such that the compensation for the error is made in accordance with the storages. Let the second defocus value compensated for the error be "$Ep_2$". Then the objective lens is controlled by utilizing the value $Ep_2$ in the manner as was done with the first detected value $Ep_1$. It should be remembered here that, in this invention, the objective lens is not controlled in accordance with the value of the amount of defocus based on each detected value provided in each detection cycle, but with the value estimated from a plurality of detected values including the last one and ones obtained in the previous detection cycle. Thus, in accordance with the present invention, when the second detected value is obtained, the first detected value is compensated for the movement of the objective lens during the second detection cycle, the mean value of the compensated first detection value $EP_1-1$ and the second detection value $Ep_2$ is calculated and used as the defocus signal for the control of the objective lens effected at the same time as the third detection cycle. In accordance with the defocus signal based on the mean value, the objective lens is controlled while the third detection cycle is carried out in a similar manner as was done with the first detection signal. Thus, in general, when a last or newest defocus value for the objective lens control is obtained, the values corresponding to the amounts of movements of the objective lens are respectively subtracted from the defocus values obtained while the objective lens is moved by given amounts, whereby a defocus value at each instantaneous moment is obtained by averaging the rest of the subtractions, and the instantaneous defocus value is compared with the infocus range value Ez to generate a motor control signal in accordance with the comparison.

Figure 5:
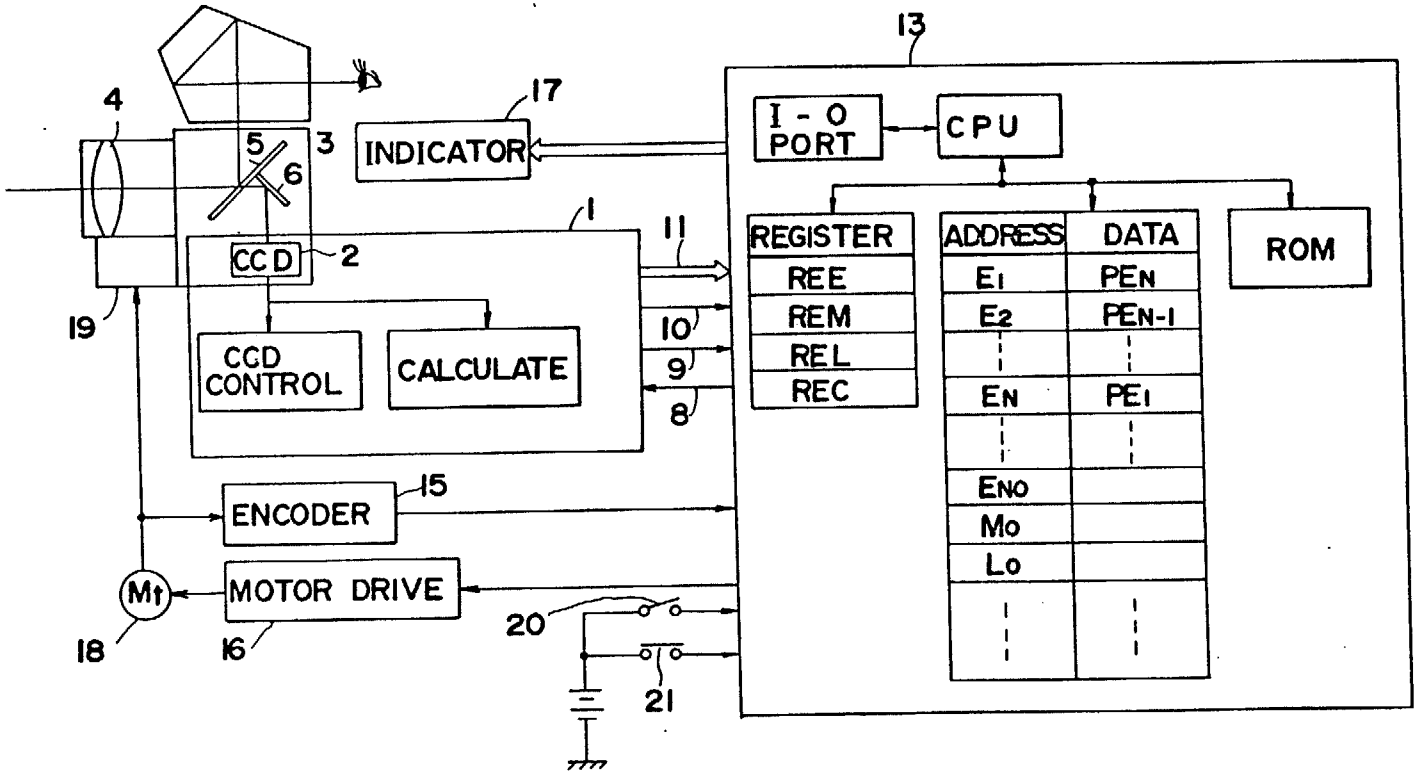
FIG. 5 is a schematic illustration of the construction of an automatic focus-adjusting device according to an embodiment of the present invention.

Then, the construction and operation of an embodiment will be described. FIG. 5 is a block diagram showing the construction of an automatic focusing device according to the present invention. Focus detecting device 1 detects the amount of defocus according to the principal of operation as explained above and has an arrangement that is known. Photoelectric device 2, consisting of a CCD having a plurality of photoelectric elements is disposed at the bottom of camera body 3. The light from a target object is led through lens 4, half-mirror 5 and auxiliary mirror 6 to photoelectric device 2. Upon receipt of an integration initiation signal for the CCD through input terminal 8, the focus detecting device 1 starts the CCD integrating and generates at output terminal 9 an integration termination signal when the CCD completes the integration of the light measurement. When the processing of the outputs of the CCD is completed, a digital signal representing the detected focusing condition is generated through output terminals which consist of eight-bit terminals. In synchronization with the generation of a digital signal, a timing signal representing the generation of the digital signal is generated from output terminal 10. Of the above eight-bit output signal, the uppermost bit is assigned (or allotted) to the indication of the defocus direction such that the digital logic "1" output from the bit represents a front focus condition of the objective lens and the digital logic "Φ" output represents a rear focus condition of the objective lens. The outputs from the remaining seven bits represent the defocus amount.

Control device 13 comprises a microcomputer known per se which includes a CPU (central processor or central processing unit), ROM (read only memory), RAM (randon access memory), various registers including an accumlator, I/O port and so on. Control device 13 receives focus detection signal, integration termination signal and timing signal from the focus detecting device 1 and pulses from encoder 15. Control device 13 applies to motor driving circuit 16 and indicating or display device 17, signals as the result of the processing of the signals from focus detecting device 1 and encoder 15. Camera objective lens 4 is interconnected with an objective lens driving mechanism 19 including motor 18 and is controlled in accordance with the output of control device 13.

Figure 6:
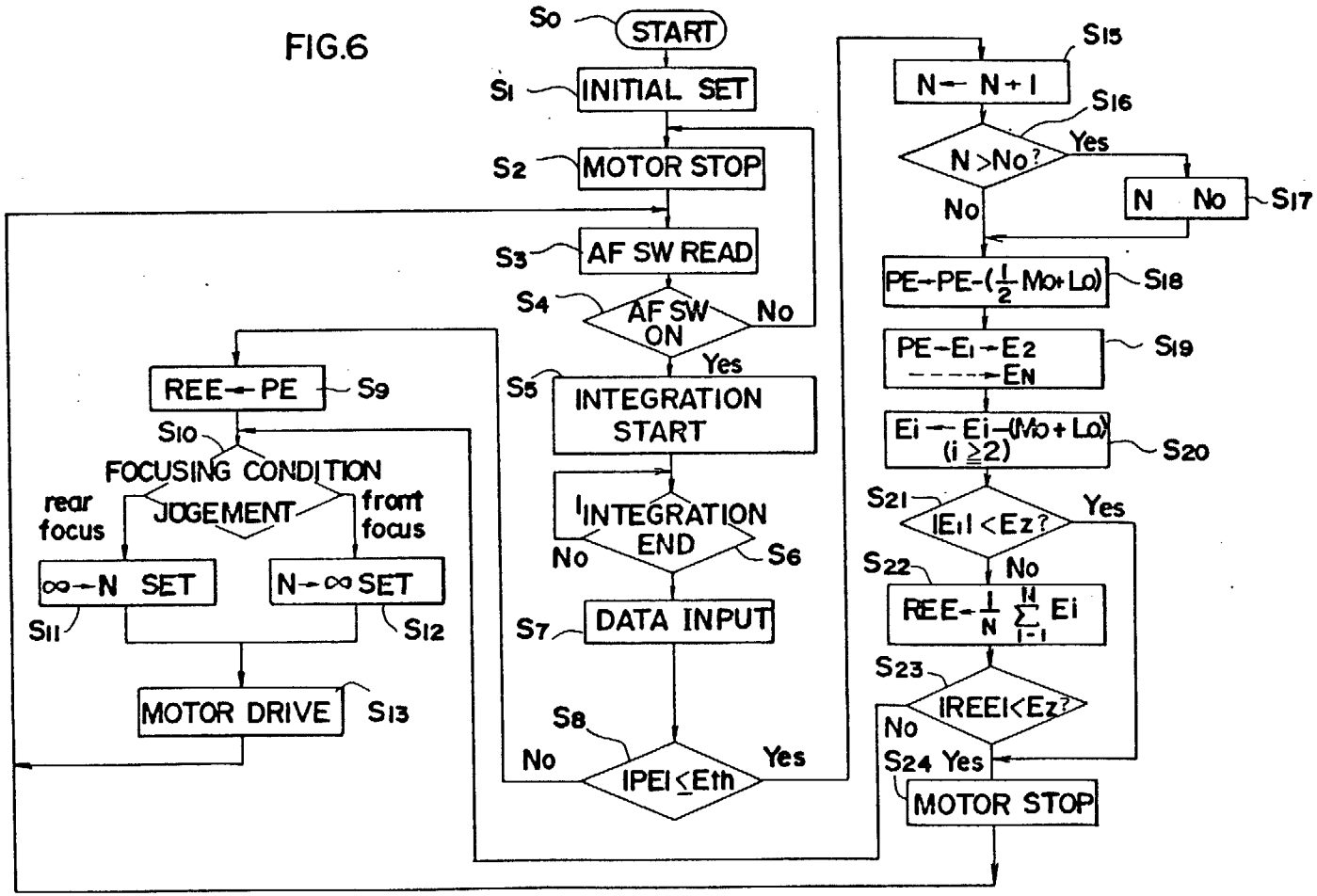
FIGS. 6 and 7 are flow charts showing the operation of the embodiment.
Figure 8:
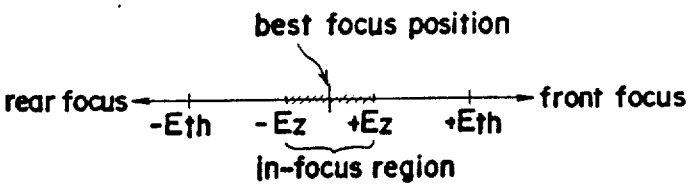
FIG. 8 is an illustration of the relationship between the value Eth to be discriminated as to its measurement of the amount of defocus and the value Ez representing an infocus range, the relationship of which is judged during the process of the focus adjustment.

Next, the operation of the embodiment is explained with reference to the flowchart shown in FIG. 6. When power switch 20 is closed to supply power to control device 13 and other required portions, data including the reference value Eth for the comparison with the defocus amount, and infocus range value Ez are initially set in predetermined memories, and every register is cleared in focus detecting device 13 (step S1). Then a control signal for making motor 18 stationary is applied to the motor driving circuit 16 (step S2). It should be assumed that the reference value Eth for discriminating the measure of the defocus amount and the infocus range discriminating value Ez are in the relationship of Eth Ez as seen in FIG. 8. In the next step S3, control device 13 goes into a waiting state for the closure of manual switch 21 for the initiation of the automatic focusing operation (step S3). Assume that the objective lens is initially a great distance away from an infocus position. In such a case, objective lens 4 is driven towards its infocus position in accordance with the initially detected defocus direction, without the plurality of output signals of the detecting device 1 being collected, compensated and statistically processed to produce a mean value signal. It should be understood that the embodiment is arranged such that the statistical process is not applied to all the values detected by detecting device 1 but only to detected values smaller than reference value Eth, which is determined to be an appropriate value during the designing of the automatic focusing system.

When AF switch 21 is closed (step S4), the integration in the CCD is started (step S5) and then a signal representing a focusing condition is generated with the integrated output of the CCD being processed. The signal representing the focusing condition (referred to as PE hereinafter) is received by control device 13 (step S7) wherein the defocus amount PE is compared with the reference value Eth (step S8). If PE>Eth, the data PE is stored in register REE (step S9), and the defocus direction, i.e. the value in MSB of the data is discriminated (step S10) so that a command signal for determining the moving direction of the objective lens is applied to the motor driving circuit 16. When the focusing condition signal shows that the objective lens is at a front-focus position, the command signal represents that the lens should be driven towards its rear-focus direction. When the focusing condition signal shows that objective lens is at a rear-focus position, the command signal represents that lens should be driven towards its front-focus direction (step S11 or S12). Thus objective lens 13 starts to move towards its infocus position by the motor (step S13). After producing the motor driving command signal, control circuit 13 again detects whether AF switch 21 is closed or open, and applies a second focus-detection command signal to detecting device 1. At the same time of this operation, encorder 15 starts, with the commencement of the rotation of motor 18, to produce a train of pulses with a frequency commensurate with the rotational speed of motor 18. As mentioned before, the interval between each adjacent pulse corresponds to the amount of movement of the objective lens that is commensurate with a unit value for the defocus amount in the signal generated from the detecting device. With such correspondence, if the content of the above mentioned register is decremented i.e. subtracted by "1" in response to each generation of one pulse from encoder 15, the content of the register then shows the amount of defocus corresponding to the instantaneous position of the objective lens. In the embodiment, the pulses from encoder 15 is input to control device 13 as interrupt requiring signals.

Figure 7:
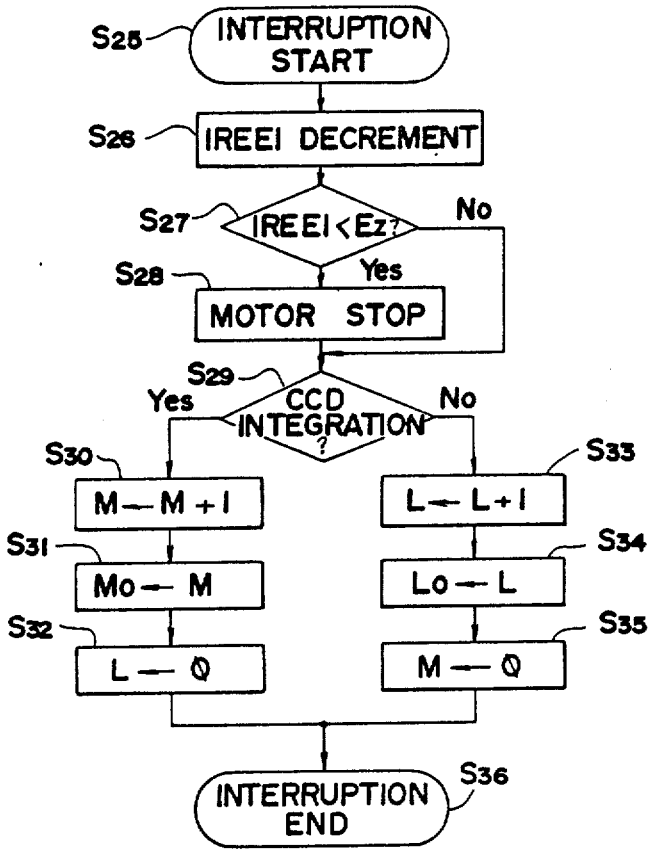

When a pulse is output from encoder 15, control device 13 receiving the pulse jumps to the processing routine shown in FIG. 7 (step S25). Then the content of register REE wherein the value of a defocus amount to be directly used for the control of the objective lens is stored, is decremented by "1" (step S26) and the resultant content of the register is compared with the infocus discriminating range value Ez (step S27). If the content REE of the register is smaller than the range value Ez, the motor stop command signal is produced (step S28). If the relationship of REE>Eth exists in the preset stage, the motor driving circuit 16 is applied with the motor drive command signal and drives motor 18 further on. In the next step S29 subsequent in the interrupt process routine, information processing is effected for detecting and calculating the amount of transportation or displacement of the objective lens. Two registers REM and REL in control device 13 used as counters, with one of them being allotted to counter M for counting the number of pulses generated from the commencement to the termination of the integration in CCD 2, while the other being allotted to counter L for counting the number of pulses generated from the termination of the integration to the commencement of the next integration.

At the present stage, this is the time when encoder 15 has generated a first pulse but has not yet generated a second pulse with CCD 2 being in the process of effecting the second integration. When step S30 in the programmed process is reached, the content in the counter M is incremented by "1" and the resultant content is stored in memory Mo with counter L being cleared. Counter M is incremented at step S30 while intergration is effected in CCD, and cleared at step 35 in the case the integration is not effected. On the other hand, counter L is cleared every time when the programmed process reaches step S32 during the integration in CCD and incremented at step S33 in case the integration is not effected. The contents of counters M and L are stored respectively in memories Mo and Lo after being incremented in the above described manner. Thus the step of interrupt process is terminated. It is now the time when the second integration operation in CCD 2 has started, and when the first pulse was generated from encoder 15, and when a required process in the interrupt process routine has been terminated. Accordingly, the content of register REE has been decremented by "1" and becomes "EP−1" and the contents of counters M and L have become respectively digital logic "1" and "0". With the termination of the interrupt process, the programmed process returns to a normal processing routine. Then, when the second pulse is produced, the programmed process is again transferred to an interrupt process routine. As the result of the processing in the second interrupt routine, the content of register REE becomes "EP−2" and the count in the counter REM becomes "2". After that, at each time of generation of a pulse, register REE is decremented, and counter M is incremented in the case of integration being effected in CCD 2 or counter L is incremented in the case of the integration not being effected in CCD 2. In this way, at a time when a detecting cycle has been terminated, memory Mo stores the data representing the amount of movement of the objective lens during the integration in the CCD and memory Lo stores the data representing the amount of movement of the objective lens from the termination of the integration in the CCD to the commencement of the integration.

When it is discriminated in step S8, that PE<Eth with respect to the last obtained amount of defocus "PE", the programmed process passes to step S15 from which a routine begins for obtaining a specific value of the amount of defocus from a plurality of detected values so that the obtained specific value is used for the control of the objective lens. Control device 13 includes memories which can store at the most No number of detected value data obtained after it was judged the PE<Eth, and counters consisting of register REC which counts the number of detected values. Addresses E1 through Eno are assigned to the No number memories. Let the character "PE1" represent the value of PE whichwas obtained at the time when PE<Eth is attained at the first time and which has been compensated for the dynamic error due to the movement of the objective lens in the steps described below. Likewise, characters "PE2", "PE3" . . . "PEn" are determined to represent second, third . . . nth obtained and the compensated value of PE wherein "PEn" represents the last or newest data. Those data are stored in memories E1 Eno in the following manner. Memory E1 stores the last data "PEn", memory E2 stores second data from the data "$PE_{n-1}$" and so on till memory En stores the oldest data "PE1". When a new data is stored in memory E1, the previously stored data are respectively shifted to the memories respectively adjoining by one address to the former memories.

Then, at step S15, register REC is incremented and a data is counted. Next, the counted number N of data is compared with memorized number No of detected data (step S16). In the initial stage, N (=1) No. In such a case, the counted value is register REC is maintained as it has been, and the process is passed to the next process. At step S18, compensation for the dynamic error due to the movement of the objective lens is at first applied to the last data of the value PE. When the signal of data PE is generated, memories Mo and Lo have the data of the amounts of movements during the integration in the CCD and during processing of output signals of the CCD. Accordingly, by making the calculation:

$$(PEn=PE-(\tfrac{1}{2}Mo+Lo),$$

the newest data "PEn" which has been compensated, is obtained. This new data "PEn" is stored in memory E1 (step S19). The old data "PEn" that has been stored in memory E1 is subtracted by (Mo+Lo) and stored in memory E2 (step S20). For the other data "PEi", compensation given by the formula:

$$PEi-(Mo+Lo)(i\ n)$$

are respectively applied and compensated data are respectively shifted to and stored in the memories at adjoining addresses. In the following description, data "PEi" (i−1, 2, 3, . . . ) are denoted in terms of their stored memory addresses Ei. Accordingly, the newest data "PEn" is denoted as E1. The data E1 En for the n times of detections and including the compensated newest data E1 are the ones that have been converted to the data to represent the amounts of defocus adapted to the position of the objective lens at the time when the newest data E1 is obtained. Of those data E1 through En, data E1 is compared with Ez. If E1<Ez, a motor stop command is once produced at step S24 and the process is passed to the next detection cycle. Contrary thereto, if E1>Ez, the arithmetic mean of the data of the past N times of detections $$\sum_{i=1}^{n}$$

is calculated and its mean data is stored in register REE at step S22. At this time, the data that has been stored previously in register REE>is erased. When the condition that REE Ez is attained for the data REE that has been refreshed in the above described manner, the process jumps to step S10 where a motor driving command is output to drive the motor for moving the objective lens towards its infocus position. If REE<Ez, a motor stop command is produced, and the programmed process is passed to the next detection cycle. It should be understood that the number N of the data used in the averaging process is limited to the upper limit value No which is the number of memories E1 through Eno. The number No may be determined in designing the system of the embodiment, to a most suitable value in accordance with experiments. The number No is for example 5 in the present embodiment. The old data that are out of the range of the number No counted from the newest data overflow from the memory addresses and are erased. Accordingly, the above statistical process are applied to the N number (1 N No) of past data counted from the newest one E1. In the case, when PE<Eth is attained for the first detected data with the initial position of the objective lens being in the vicinity of its infocus position, the statictical process is, of course, applied to the data including the initial data.

Figure 9:
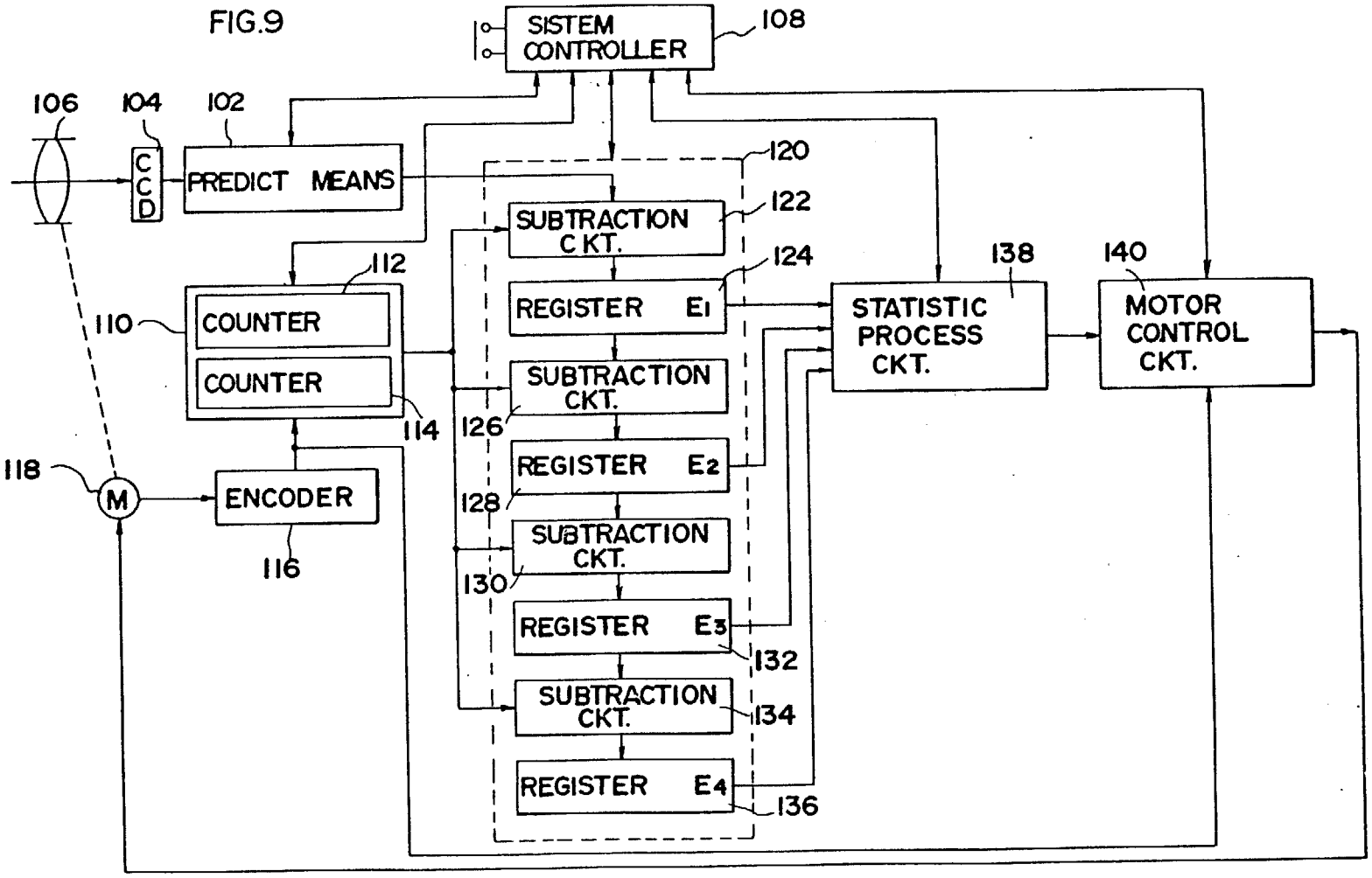
FIG. 9 is a block diagram showing the embodiment in more detail.

FIG. 9 is a block diagram showing more in detail the construction of the embodiment of the present invention. With reference to the Figure, detecting means including predict means 102 and CCD 104 is known per se as mentioned before and includes CCD 104 to generate a predict signal representing the focusing condition, i.e. the distance between the image formed by objective lens 106 and a predetermined image plane to be focused, as well as representing whether the formed image is before or after the image plane. Receiving an integration initiation command signal from system controller 108, predict means 102 initiates the integration in CCD and supplies timing signals to system controller 108 at the time of the termination of the integration and at the time when it generates the predict signal processing the integration data from CCD 104. First counter 112 included in counter means 110 counts the number of pulses supplied from encoder 116 during the period from the termination of the integration in CCD 104, while second counter 114 counts the number of pulses supplied from encoder 116 during the period from the termination of the integration to the generation of the predict signal. Both counters 112 and 114 are cleared, at the latest, just before the initiation of next integration cycle in CCD 104.

Encoder 116 is linked with driving motor 118 for objective lens 106, and generates pulses with a frequency proportional to the rotational speed of motor 118. The number of pulses produced during a period indicates the distance for which objective lens 106 is moved along its optical axis during that period. Accordingly, first counter 112 holds the data of the distance for which objective lens 106 is moved during the integration in CCD 104, while the second counter 114 holds the data of the distance for which objective lens 106 moved during the processing of the data integrated in CCD 104.

Compensation circuit 120 is provided for compensating the predict signal for the distance for which objective lens 106 has moved. Subtraction circuit 122 subtracts ($\frac{1}{2}$M+L) from predict signal EP produced by detecting means. The symbol M represents the value of the distance data held in first counter 112 while L represents the value of the distance data held in second counter 114. The output of subtraction circuit 122 is the predict signal EP1 that has been compensated to be adapted to the position of the objective lens at the time when the predict signal is generated. The output is stored in register 124, with the signal previously stored in the register 124 being abandoned. Before such abandonment, subtraction circuits 126, 130 and 136 respectively subtract (M+L) from respective predict signals which have been stored in registers 124, 128, 132, respectively. The results of the subtractions are stored in registers 128, 132 and 136 respectively. As may be apparent from the above description, the predict signal stored in register 128 corresponds to the signal obtained in the detecting cycle one time before the detecting cycle which detected the predict signal stored in register 124. Likewise, predict signals stored in registers 132 and 136 correspond to the signals obtained in the detection cycles two or three times before the same. The predict signals stored in registers 124, 128, 132 and 136 are respectively given by formulas (5), (4), (3) and (2) described before, wherein EP1, EP2, EP3 and EP4 represent predict signals which were obtained in detection cycles C1, C2, C3 and C4 and which were not compensated for the moved distances. After that, the operation similar to that described above are effected in response to the application of the result of a detection cycle. Statistical processing circuit 138 is used to calculate the mean value of data stored in registers 124, 128, 132 and 136 each time whe new data are stored in the registers. However, at a time soon after the initiation of the detecting operation and when only one predict signal according to the first detection cycle is generated, it is not necessary to calculate the mean value, and the value which is not compensated is applied to the next stage.

At the next stage of the process when two predict signals have been provided by the first and second detecting cycles, the means value of the data E1 and Ez in registers 124 and 128 is obtained. Further at the stage of the process when the predict signal has been provided by the third detecting cycle, the mean value is obtained from three data E1, E2 and E3. To effect those processing operations, system controller 108 counts the number of detecting cycles from the initiation of the focus detecting operation so that the mean value is obtained for the data of the number equal to the number of detecting cycles and is obtained until the number of detecting cycles reaches four. When the number of detecting cycles is four or more, the mean value is always obtained for four data. It is to be understood that the maximum number may not be restricted to four.

Motor control circuit 140 controls the driving of motor 118 in accordance with the mean value supplied from statistically processing circuit 138. The circuit 140 has a basic function to rotate motor 118 in the direction commensurate with the signal indicating the direction of defocus in accordance with an averaged predict signal, and compare the signal representing an amount of defocus with the signal range Ez representing the infocus zone to stop motor 118 when the defocus amount signal reaches within the infocus signal range. Motor driving circuit 140 is provided with a presettable counter in which the averaged predict signal from the statistically processing circuit 138 is set. Subtraction in accordance with the pulses from encoder 116 is applied to the set value so that the defocus amount for the position of the objective lens is obtained one after another in the detection cycle. The defocus amount counted in the presettable counter is compared with infocus range value Ez.

In the above described embodiment, an arithmetic mean value of N number of data is obtained and used as the final information of defocus for the lens control.

The statistical procession of the data is not limited to the manner employed in the embodiment, but may include other various processing manner such as the procession wherein the medium of N number of data is obtained and used for the control, the ones wherein the mean of the maximum and minimum values of N number of data i.e. center value is obtained and used for the lens control, or the ones wherein of the predetermined zones, a zone in which the greatest number of data are involved is detected and used for the lens control.

As is apparent from the above description, the automatic focusing device according to the present invention is arranged such that as the objective lens is moved towards its infocus position, each of a plurality of detected focus data obtained repeatedly during the displacement of the objective lens, is converted to information of defocus for the position of the objective lens at the time when the last or newest focus data is obtained, the plurality of converted defocus data are statistically processed, whereby the errors included in the data detected by the detecting device due to the structure of the focusing device is eliminated and the data of the defocus obtained as the result of the statistical procession is used as the resultant data for the focus control of the objective lens. With the device of the present invention, a focusing operation is effected quickly and with high accuracy.

What is claimed is:

1. An automatic focusing system for use in a camera comprising:

means for successively during an objective lens of said camera along its optical axis;

means for repeatedly detecting a focusing condition of the objective lens during the movement of the objective lens to produce a detecting signal which includes information of a defocus direction and a defocus amount of the objective lens with respect to a predetermined image plane;

means for monitoring an amount of axial movement of the objective lens between successive detections to produce a lens moving amount signal which represents the detected amount;

means for converting each detecting signal into a corresponding converted signal which would be produced from said detecting means upon the last detection in accordance with said lens moving amount signals;

means for producing a final signal in response to the converted signals in accordance with a predetermined statistic method; and means for controlling said driving means in response to said final signal.

2. An automatic focusing system for use in a camera as claimed in claim 1, wherein said detecting means includes means for receiving scene light transmitted through the objective lens and means for producing said detecting signal according to a received condition of said receiving means.

3. An automatic focusing system for use in a camera as claimed in claim 2, wherein said receiving means includes a plurality of light receiving elements located on a plane which is optically equal to said predetermined image plane.

4. An automatic focusing system for use in a camera as claimed in claim 3, wherein said detecting means includes a charge coupled device (CCD) light receiving device which has a plurality of light receiving elements, said light receiving elements storing charges, the amount of which is in proportion to the light intensity received by each of said light receiving elements, said light receiving device being and constructed to measure light intensity received by each light receiving element by integrating the charge stored in each light receiving element to output in turn light measuring signals each of which represents the light intensity received by each light receiving element, and means for processing said light measuring signals to detect the focusing condition of the objective lens.

5. An automatic focusing system for use in a camera as claimed in claim 1, wherein said lens driving means includes a motor which is actuated for moving the objective lens along the optical axis, and wherein said control means is constructed to determine a rotational direction of said motor.

6. An automatic focusing system for use in a camera as claimed in claim 5, wherein said monitoring means includes means for monitoring the rotational amount of said motor.

7. An automatic focusing system for use in a camera as claimed in claim 6, wherein said rotational amount monitoring means includes an encoder which generates a train of pulses whose frequency corresponds to the rotational speed of said motor.

8. An automatic focusing system for use in a camera as claimed in claim 7, wherein said control means includes means for counting, from a value corresponding to said last final signal, a value corresponding to the number of pulses from said encoder, means for comparing the counted value of said counting means with a predetermined value range which corresponds to a predetermined in-focus zone, and means for interrupting the movement of the objective lens when said counted value reaches within said predetermined value range.

9. An automatic focusing system for use in a camera as claimed in claim 1, wherein said converting means is constructed to convert said detecting signals previously produced into said respective converted signals from a predetermined number of said detecting signals.

10. An automatic focusing system for use in a camera as claimed in claim 1, wherein said producing means includes means for arithmetically averaging said values corresponding to said respective converted signals and to the last detecting signal which has not been converted.

11. An automatic focusing system for use in a camera as claimed in claim 1, wherein said control means includes means for discriminating whether or not said detecting signal reaches a predetermined signal level, and means for determining the moving direction of the objective lens in response to said detecting signal which has not been converted if the discriminated result represents that said detecting signal does not reach said predetermined signal level.

12. An automatic focusing system for use in a camera as claimed in claim 1, wherein said converting means includes means for memorizing each of said detecting signals, means for memorizing each of said lens moving amount signals, and means for modifying each of said memorized detecting signals into a corresponding converted signal, in accordance with each of said lens moving amount signals, which represents the axial distance between the lens position at the corresponding detection and that at the last detection.

13. An automatic focusing system for use in a camera as claimed in claim 1, wherein said converting means includes means, upon receipt of a new detecting signal, for transferring the detecting signals previously received into corresponding converted signals as if each converted signal were produced upon the new detection.

14. An automatic focusing system for use in a camera comprising:

means for driving an objective lens along its optical axis;

means for repeatedly detecting a focusing condition of the lens to produce a defocus signal at the end of each detection, each of said detecting signals include information of a defocus direction and a defocus amount of the lens position when each detection is completed;

means for monitoring the lens position along its optical axis at the end of each detection to produce a lens position signal representing the monitored lens position;

means for converting each of said defocus signals previously produced from said detecting means into each corresponding converted signal as if the converted signal was obtained at the last detection;

means for producing a final signal in response to said converted signals in accordance with a predetermined statistic method; and means for controlling said driving means in response to said final signal.

15. An automatic focusing system for use in a camera as claimed in claim 14, wherein said detecting means includes at least a charge storing type light receiving device located for detecting an image forming condition of the lens, means for processing successive outputs from said light receiving device to produce a focus signal, means for measuring an axial displacement of the lens during the integration in said light receiving device, means for measuring an axial displacement during the processsing of said successive outputs and means for modifying said focus signal into said defocus signal by a compensation for a lens axial displacement from the middle point of the axial displacement during said integration to the end of the axial displacement during said processing of successive outputs.

*16. An automatic focusing device for use in a camera, comprising:*

*means for receiving light through an objective lens of the camera to produce electric signals;*

*means for processing the electric signals to generate a defocusing information indicative of defocusing degree and defocusing direction relative to an ideal focal plane;*

*means for generating a driving power for automatic focus control;*

*means for controlling the generating means in response to the processing means;*

*means for causing the receiving means and the processing means to periodically repeat the production of the electric signals and the generation of the defocusing information during the generation of the driving power to keep the controlling means informed of the newest defocusing information in the course of generation of the driving power;*

*means for detecting a condition for stopping the generation of the driving power to stop the generation of the driving power on the condition; and*

*means for confirming the establishment of the condition in response to the processing means with the generation of the driving power completely stopped to determine the necessity of reopening the generation of the driving power in case that the condition is not really established.*

*17. An automatic focusing device for use in a camera as claimed in claim 16, wherein the detecting means includes first means responsive to the processing means for reporting an in-focus condition during the generation of the driving power, and the confirming means includes second means responsive to the processing means for reporting an in-focus condition with the generation of the driving power completely stopped.*

*18. An automatic focusing device for use in a camera as claimed in claim 17, wherein the second reporting means includes means for providing an in-focus data indicative of a limit of the defocusing degree within which the in-focus condition is considered to be established, and means for determining whether or not the defocusing degree of the defocusing information is within the limit.*

*19. An automatic focusing device for use in a camera as claimed in claim 17, wherein the first reporting means includes means for providing an in-focus data indicative of a limit of the defocusing degree within which the in-focus condition is considered to be established, and means for determining whether or not the defocusing degree of the defocusing information is within the limit.*

*20. An automatic focusing device for use in a camera as claimed in claim 17, wherein the first reporting means includes means for informing that the focus adjustment is carried out by the generating means to a degree of cancelling the defocusing degree of the defocusing information generated by the processing means.*

* * * * *